United States Patent [19]

Daily

[11] Patent Number: 4,798,474
[45] Date of Patent: Jan. 17, 1989

[54] IN-SITU PIPELINE COATING SYSTEM

[75] Inventor: Joseph V. Daily, Spring, Tex.

[73] Assignee: Union Carbide Corporation, Danbury, Conn.

[21] Appl. No.: 111,509

[22] Filed: Oct. 22, 1987

[51] Int. Cl.⁴ .......................... B05C 3/02; B01F 15/04
[52] U.S. Cl. .................................... 118/408; 366/162; 118/DIG. 10
[58] Field of Search ............... 366/160, 161, 162, 152, 366/16, 17, 18, 19, 21; 118/DIG. 10, 408

[56] References Cited

U.S. PATENT DOCUMENTS

| | | | |
|---|---|---|---|
| 2,445,645 | 7/1948 | Stephens | 118/408 |
| 2,918,435 | 12/1959 | Warner | 366/162 |
| 3,041,204 | 6/1962 | Green | 118/408 |
| 3,067,987 | 12/1962 | Ballou | 366/161 |
| 3,623,704 | 11/1971 | Skobel | 366/160 |
| 4,089,998 | 5/1978 | Gibson | 118/DIG. 10 |
| 4,381,727 | 5/1983 | Yamaguchi | 118/408 |

OTHER PUBLICATIONS

"In-Place Coating Method", Pipeline & Gas Journal, Jul. 1986, pp. 25-27.
"Internal Pipeline Corrosion Controlled With In Situ Coating Service"-Joseph V. Daily, Pipeline Digest, Mar. 1987, pp. 11-14.
"Application of Internal Coatings for Corrosion Protection of In-Place Pipeline" Joseph V. Daily, Seventh Annual ILTA National Operating Conference, Houston, Tex., Jun. 15-16, 1987.
"High Technology Chemical Curing Polyurethane Coatings for Commerce and Industry" Madison Chemical Industries, Inc. (brochure) (date unknown).
"NAPKO Pipe Coatings 7-0051 High Performance In-Place Pipeliner" (product sheet) (date unknown).
"Corropipe Pipeline Coatings-Technical Data", Madison Chemical Industries, Inc.-(date unknown).

Primary Examiner—Robert W. Jenkins
Attorney, Agent, or Firm—Alvin H. Fritschler

[57] ABSTRACT

A self-contained trailer mounted proportioning, mixing, injection and collection system enables pipelines to be conveniently coated in-situ using two-component coating compositions moved through the pipeline by a double pig system without solvent vapor exposure, liquid spills or drips, undesired air bubble formation in the coating composition or exposure of operating personnel to pressurized gas, solvent vapors or liquid coating material splash or hazardous flammable or explosive conditions.

24 Claims, 3 Drawing Sheets

IN-SITU PIPELINE COATING SYSTEM

BACKGROUND OF THE INVENTION

1. Field of the Invention

The invention relates to the in situ coating of the internal surfaces of pipelines. More particularly, it relates to an in situ coating system overcoming the disadvantages associated with conventional in situ coating techniques.

2. Description of the Prior Art

The in-situ coating of the internal surfaces of pipelines, using the double plug extrusion approach, has been practiced basically without change since its inception in the early 1940's. The standard procedure employed comprises trapping a solid slug of coating material between two pigs (or plugs) and moving this pig system through the pipeline by means of the force produced by a differential pressure imposed across the pig system. As the double pig system moves through the pipeline to be coated, the coating material is extruded onto the internal pipe surface by the trailing pig.

In the practice of this standard procedure, a two part epoxy coating composition is batch mixed at the inlet of the pipeline to be coated. The coating composition consists of a coating resin component and a hardener component. The hardener is manually poured into the resin until the proper volume ratio of components is achieved. The resulting mixture is then blended by hand stirring, or by means of an impeller driven by a pneumatic motor. The thus blended mixture is then hand poured, or pumped through a hose into the pipeline at the inlet end thereof between the leading and trailing pigs of the double pig system.

This batch mixing procedure requires frequent movement of material storage drums, typically weighing about 650 lbs., and the hand lifting of 5 gallon pails weighing about 45 lbs. During the practice of this procedure, coating spills, dripping and splashing often occur as the result of the removal and insertion of awkward mixing and pumping devices into the coating material containers. In addition, the containers must remain open for the mixing and pumping operations, thus causing direct exposure of operating personnel to solvent vapors.

Batch mixing and injection as employed in the standard practice are also time consuming operations. This time factor is particularly important, and becomes critical, in hot weather conditions, under which the so called "pot life" of the coating composition is shortened. The undesirable introduction of air bubbles into the coating compositions also occurs in the course of the customary hand mixing or mixing by the use of impeller means.

In addition to such practical operating problems and concerns at the inlet end of the pipe, the standard procedure is also confronted with practical problems and concerns at the outlet end of the pipe. The standard procedure at said outlet end is to manually adjust a discharge throttle valve to control back pressure as the dual pig system, or pig train, moves through the pipeline to be coated. A discharge hose is connected to the pipeline to remove excess coating material therefrom, said hose typically being connected to the pipeline at a point upstream of the point at which the leading pig of the pig system is stopped by a suitable bumper or gate. As the trailing pig continues to move in the direction of the then stationary leading pig, excess coating material is forced from the pipeline through said discharge hose. The discharge throttle valve is typically positioned in the discharge hose line that extends from the pipeline to an open drum used to collect excess coating material. Two operators are usually required for carrying out the necessary operations at the outlet end of the pipeline. The operator is needed to control the discharge throttle valve, while the other holds the discharge hose in the open drum being used to collect the excess coating material. The flow of coating material and of associated gas through the hose has a tendency to whip the hose around in a manner making such manual attention necessary from a practical operating viewpoint. Before the coating pig stream reaches the downstream end of the pipeline, a pressurized gas flow will be discharged through the discharge throttle valve and from the discharge hose. When the pig train arrives at said downstream end of the pipe, and the leading pig is stopped, the flow through the discharge hose changes abruptly from pressurized gas flow to excess coating material discharge. As a result, such operations are typically accompanied by the splashing and spilling of excess coating material and the exposure of the operators to solvent vapors.

While the in situ coating of pipelines is a highly desirable, and even essential, approach to necessary pipeline maintenance, it will thus be appreciated that numerous practical operating problems and disadvantages are associated with the standard procedure employed in the art for using two component coating compositions and dual pig systems. There is a genuine need in the art to overcome such problems and disadvantages not only to enable the in situ coating operation to be carried out more efficiently at a jobsite, with greater protection of operating personnel from environmental hazards and from the potential for vapor ignition and explosive conditions, but also to enable the effectiveness of the in situ coating operation itself to be enhanced.

It is an object of the invention, therefore, to provide an improved system for the in situ coating of pipelines.

It is another object of the invention to provide a system for the proportioning and mixing of two component coating compositions effectively avoiding solvent vapor exposure and coating material spills and drips at the inlet end of the pipeline to be coated.

It is another object of the invention to provide an in-situ pipeline coating system in which the proportioning and mixing of the components of a two component coating composition, and the injection thereof into the pipeline to be coated, can be carried out without the undesirable introduction of air bubbles into the coating composition.

It is a further object of the invention to provide an in situ coating system in which the passage of the dual pig system through the pipeline can be effectively controlled and excess coating material can be effectively discharged at the downstream end of the pipeline without exposure of operating personnel to pressurized gas, solvent vapors, and coating material splash.

With these and other objects in mind, the invention is hereinafter described in detail, the novel features thereof being particularly pointed out in the appended claims.

SUMMARY OF THE INVENTION

The invention combines a plural component proportioning device with an in line mixer in a self contained system for the proportioning and mixing of the components of a two component coating composition for ready injection into the upstream end of the pipeline to be coated. At the downstream end of the pipeline, a discharge control system effectively controls the passage of the dual pig system containing said coating composition through the pipeline with effective means for passing excess coating material to a collection vessel without the exposure of operating personnel to the operating hazards encountered in conventional practice.

BRIEF DESCRIPTION OF THE DRAWINGS

The invention is hereinafter further described with reference to the accompanying drawings in which.

DETAILED DESCRIPTION OF THE INVENTION

The objects of the invention are accomplished by a novel system for proportioning and mixing the components of a two component coating composition for injection into a pipeline for passage therethrough in a double pig system, together with a novel discharge control system positioned at the downstream end of the pipeline to be coated. The upstream portion of the in situ coating system of the invention is a self contained system providing a highly advantageous means to continuously proportion, mix and deliver the coating composition to the pipeline with minimal manual effort and with the elimination of solvent vapor exposure and of coating spills or drips. This self contained system can accomplish such operations in considerably less time than in the batch handling operations of the conventional in-situ coating approach, while avoiding the undesired inducing of air into the coating material that occurs in said conventional approach. At the downstream end of the pipeline, the discharge control portion of the in-situ coating system of the invention enables the coating compositions thus delivered to the pipeline at the upstream end thereof to be passed through the pipeline in a double plug system in an advantageously controlled manner with the convenient passage of excess coating material to suitable collection means without the exposure of operating personnel to pressurized gas, solvent vapors and coating liquid splash as occurs in the practice of the standard procedure for in situ coating operations employed in the art.

Figure 1:
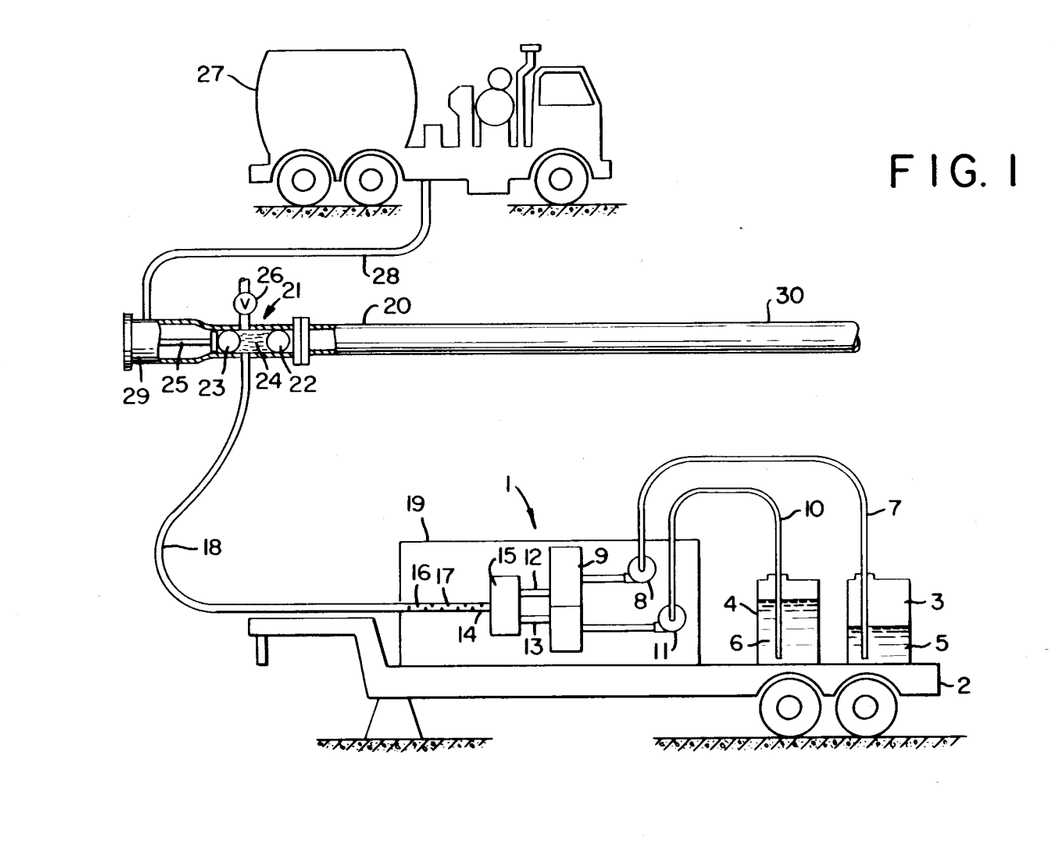
FIG. 1 represents a schematic diagram illustrating the two component coating composition proportioning and mixing system of the invention, together with the system for the injection of said coating composition into a pipeline to be coated and for the passage of said coating composition though said pipeline.

As will be seen in FIG. 1 of the drawings, the proportioning, mixing and injection system of the invention is conveniently and desirably employed in a self contained trailer mounted form in preferred embodiments of the invention. It will be appreciated that such trailer mounted form enables the necessary elements of the proportioning, mixing and injection system to be readily transported to a jobsite in a more convenient manner than is the case for conventional batch type operations. Pre job preparation time is thus minimized, in addition to the considerable savings in actual operating time made possible by the invention. Referring to said FIG. 1, the self-contained coating composition proportioning, mixing and injection system, represented generally by the numeral 1, is shown mounted on trailer 2 for convenience of delivery to a jobsite at which the two component coating composition is to be injected into pipeline 3 for the in situ coating thereof. It will be appreciated that the portion of pipeline 3 shown in FIG. 1 is the inlet or upstream end of the overall pipeline to be coated, the downstream end thereof being shown in FIG. 2 of the drawings. Mounted on trailer 2 are separate storage drums 3 and 4 containing coating resin component 5 and hardener component 6, respectively, of the desired two component coating composition. It will be appreciated that more than one drum of each component of the coating composition can be stored in trailer 2, with the suction rods or lines used to draw material from the drums conveniently being changed from drum to drum as required during the in situ coating operation. Line 7, with pump means 8 therein, is used to draw coating resin component 5 from storage drum 3 to plural component proportioning device 9 adapted to achieve the desired proportioning of the two components of the coating composition. Similarly, line 10, with pump means 11 therein, is used to draw hardener component 6 from storage drum 4 to said plural component proportioning device 9. Coating resin component 5 will generally comprise a resin base material and a solvent therefor, together with any desired paint pigments desired to be added to the resin base material for a particular coating application. The ingredients of the resin component of the overall coating composition must generally be maintained in a stirred condition by suitable stirring means, not shown in the drawing. It will be seen, however, that drums 5 and 6 can readily be covered, and the desired coating components can be withdrawn therefrom while said drums are maintained in covered form, avoiding the release of solvent or other vapors therefrom.

Plural component proportioning device 9 comprises an adaptation of a known, commercially available proportioning device to the flow rates and pressures desired for the supply of accurately proportioned, thoroughly mixed coating compositions to the pipeline to be coated in the in situ pipeline coating applications to which the invention herein disclosed and claimed is specifically directed. Such proportioning devices have heretofore been employed to proportion, mix and supply two component coating systems to spray guns. Such conventional spray gun applications generally involve mixed coating flow rates of up to about 2 gallons/minute, typically about 1 gallon/minute, with multiple sprays commonly being employed for higher flow rate applications. For the in situ coating application of present interest, flow rates and pressures well above those normally used for spraying are desirable, with the time required for proportioning of the coating components being far less by the use of the self contained system of the invention than in the batch procedure of conventional practice. For particular in situ pipeline coating applications, it will generally be desirable to employ a plural component proportioning device capable of proportioning the components of the two component coating composition such as to supply a flow of up to about 9 gallons/minute of mixed coating at pressures of up to about 950 psig. Those skilled in the art will appreciate, however, that the flow requirements pertaining to any given application will depend upon the overall conditions pertaining to that in situ coating application, including the size of the pipeline, the amount of coating to be deposited, the nature of the coating composition, the operating conditions prevailing at the job site, and the like.

Lines 12 and 13 pass predetermined amounts of the coating resin component and the hardener component, respectively, to in line mixer 16 so that the desired proportions of the two component coating composition are injected and thoroughly mixed at the desired rate for delivery to the pipeline to be coated. Said in line mixer 14, which is an item of commerce that can readily be purchased, conveniently comprises an inlet manifold 15 and a motionless mixer 16. The motionless mixer conveniently includes baffle means 17 therein to enhance the desired mixing of the components of the coating composition. It will be appreciated, however, that the turbulence created upon the introduction of the two gas streams into the motionless mixer or into said inlet manifold may be sufficient to achieve the desired thorough mixing of the coating composition components. Although not illustrated in the drawing, it will be further appreciated that the two coating component streams can be introduced into said in line mixer 14, which is an enclosed vessel, from opposite directions to enhanced the mixing action and turbulence created upon impact of the two separate coating component streams.

The coating composition comprising thoroughly mixed resin and hardener components is passed through line or hose 18 for introduction into the pipeline to be coated. As shown in the drawing, support frame 19 is desirably provided for the convenient positioning and covering of proportioning device 9, pumps 8 and 11, and in line mixer 14 on trailer means 2 and to facilitate the removal of said overall proportioning mixing injection system from said trailer means, if desired.

The system as described above will be seen to enable the coating composition components to be transported from the separate storage drums therefor to line 18 for delivery to the pipeline to be coated in a self contained manner, significantly faster than can be accomplished in the conventional batch-type in situ coating operations of the art, and without operating personnel necessarily seeing the coating composition or being exposed to said composition or the components thereof in any manner. As all of the elements of the system are either self contained or capable of being covered, i.e. the component storage drums, the plural component proportioning device, and the in line mixer manifold, coating solvent discharge and coating component spills or drips, as well as hazardous flammable or explosive conditions, are effectively precluded. In addition, in-line mixer 14, adapted to receive and mix the predetermined amounts of the coating composition components to form said two component coating composition, is an enclosed vessel, enabling the desired mixing to be accomplished without the undesired exposure of the coating composition to air. Thus, the problems associated with the conventional in situ coating procedure of the art are effectively overcome.

The pipeline to be coated is represented in FIG. 1 by the numeral 20. A double pig system, adapted for movement through pipeline 20 and generally represented by the numeral 21, comprises leading pig 22 and trailing pig 23. A desired amount of two component coating composition 24 is pumped through line 18 for positioning in pipeline 20 at the inlet end thereof between leading pig 22 and trailing pig 23. This coating composition 24 will be extruded onto the inner surface of pipeline 20 by trailing pig 23 as double pig system 21 is moved through said pipeline 20. It will be understood that the pig members may comprise any known type of pig or plug device suitable for the trapping and moving of a quantity of coating material through a pipeline under the force produced by the establishment of a differential pressure across the double pig system. Leading pig 22 and trailing pig 23 are shown as inflatable spheres that can be pushed into place in pipeline 20 by means of gas pressure, with the trailing pig retained in place by plunger 25. Relief valve 26 is conveniently placed in pipeline 20 intermediate the positioning of the leading and trailing pigs to facilitate the passing of coating composition 24 into the predetermined space between said leading and trailing pigs.

The force to move double pig system 20, and a predetermined amount of entrained coating composition 24, through pipeline 20 is conveniently supplied by nitrogen or other gas propellant means. In the FIG. 1 embodiment, a storage truck 27 is provided as a source of pressurized nitrogen gas to be used as a propelling gas stream. Such gas stream is passed from storage truck 27 through line 28 for injection into pipeline 20 through a suitable inlet, such as injection head 29, upstream of trailing pig 23. A throttle valve, not shown in FIG. 1, at the downstream end 30 of pipeline 20, is conveniently used to control the back pressure in pipeline 20, and thus to control the pressure differential across double pig system 21 for controlled movement thereof through pipeline 20. Excess coating collection means, not shown in FIG. 1, are positioned at the downstream end of pipeline 20. It will be appreciated, therefore, that the apparatus for proportioning and mixing of two coat compositions for injection into a pipeline for the in situ coating of the internal surface thereof, without solvent vapor exposure, liquid spills, drips or undesired air bubble formation in the coating composition, can readily be employed for desirable double pig extrusion onto said internal surface of the pipeline. The coating operation at the inlet end of the pipeline, and the in situ coating operation itself, will thus be seen to comprise, of themselves, an improved system for the in situ coating of pipelines. At the downstream discharge end of pipeline 20, it is likewise desirable to provide for the convenient discharge of excess coating material from the pipeline in a self-contained system without exposure of operating personnel to pressurized gas, solvent vapors or liquid coating material splash. The embodiments of the invention relating to such downstream conditions, and to the downstream control of the passage of double pig system 21 through pipeline 20 are described below with reference to FIG. 2 of the drawings.

Figure 2:
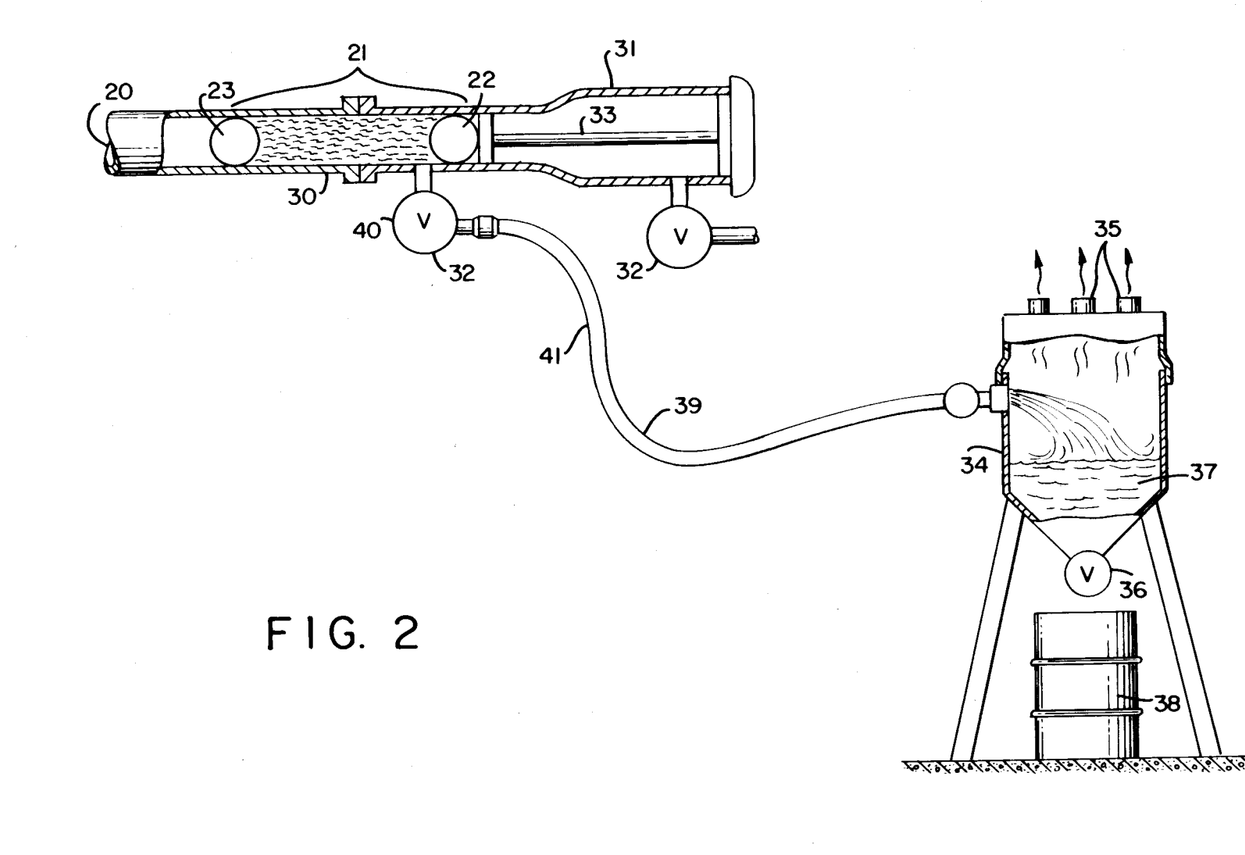
FIG. 2 represents a schematic diagram illustrating the discharge control system feature of the invention positioned at the downstream end of the pipeline to be coated.

As double pig system 21 advances in pipeline 20 to be coated from the inlet to the discharge end thereof, gas in said pipeline ahead of the pig system is displaced and moved to the downstream or discharge end 30 thereof. As shown in FIG. 2, receiver end piece 31 is attached to said downstream end 30 to facilitate the convenient and efficient collection of excess coating material and the maintenance of a desired back pressure for the controlled movement of the double pig system through the pipeline. Back pressure relief valve 32 is applied to said receiver 31 and is adapted to maintain a desired back pressure at said downstream end 30 of pipeline 20 as the gas displaced by the movement of double pig system 21 moves through the pipeline in the direction of the downstream end thereof. Bumper means 33 are positioned in said receiver 31 and are adapted to stop the movement of leading pig 22 of double pig system 21 at a predetermined location upstream of said relief valve 32.

When leading pig 22 reaches bumper means 33 and the movement of said pig is stopped thereby, it will be appreciated that trailing pig 23 will continue to move, under the applicable driving force, in the downstream direction so as to approach the then stationary leading pig 22. During said movement of trailing pig 23, coating material C will continue to be extruded into the internal pipe surface so that the entire length of the pipeline is properly coated. Because of the presence of excess coating material between the leading and trailing pigs, the pressure between said pigs increases upon the continued movement of trailing pig 23 in the direction of leading pig 22. Collection vessel 34 is provided for the collection of such excess coating material. Vent means 35 are provided on collection vessel 34 for the removal of gases therefrom, with liquid discharge means 36 being used to withdraw excess liquid coating 37 from the collection vessel, as for removal in storage drum 38.

Conduit means 39 are connected to receiver end piece 31 and to collection vessel 34 to provide for the discharge of excess coating from downstream end 30 of pipeline 20 and said attached receiver 21 to the collection vessel. It will be appreciated that conduit means 39 are desirably positioned slightly upstream of leading pig 22, which is stopped by bumper means 33, so as to conveniently discharge excess coating from said receiver, while minimizing the amount of excess coating material present in the downstream end 30 of the pipeline being coated and in receiver end piece 31. In preferred embodiments of the invention, a second pressure relief valve 40 applied to receiver end piece 31 is positioned upstream of bumper means 33 and of leading pig 22 upon the stopping of said pig by said bumper means. This second pressure relief valve 40 is adapted to discharge excess coating material from the pipeline at a predetermined pressure in excess of the desired back pressure established by back pressure relief valve 32. In FIG. 2 of the drawings, said second pressure relief valve 40 is conveniently affixed to receiver 31, with conduit means 39 being attached to said second pressure relief valve 40 to establish the desired fluid flow path for excess coating 41 between receiver 31 and collection vessel 34. Conduit 39 typically contains control valve 41 to control the flow of excess coating into collection vessel 34. Pressure relief valves 32 and 40 are thus valves that are preset at desired pressure levels for the particular coating application being carried out, with second pressure relief valve 40 being preset at a somewhat higher pressure than that of back pressure relief valve 32, which is used to maintain a desired back pressure at the downstream end of the pipeline to assure the controlled movement of the double pig system through the pipeline.

Using the discharge control system of the invention, the passage of the double pig system through the pipeline can be conveniently controlled, and excess coating material can be conveniently discharged from the pipeline in a self contained system without exposure of operating personnel to pressurized gas, solvent vapors or liquid coating material splash. By the use of such an advantageous discharge system, together with the apparatus described above for the proportioning and mixing of two part coating compositions for injection into a pipeline for the in-situ coating of the internal surface thereof, the entire coating operation can be carried out in an integrated overall coating system overcoming the disadvantages of exposure of operating personnel to vapors and liquids, and of the coating composition to undesired bubble formation, as occurs in the conventional practice.

It will be understood that various changes and modifications can be made in the details of the invention without departing from the scope of the invention as set forth in the appended claims. Thus, while pump means 8 and 11 are conveniently employed to pass the separate components of the coating composition from its storage means to the plural component proportioning device, any other available means for creating a positive pressure in the separate conduit means for passing said components from the storage means to the proportioning device can be employed. For example, storage drums 3 and 4 can be positioned on trailer 2 at an elevated location so as to utilize hydrostatic pressure to facilitate the passage of the coating components to plural component proportioning device 9.

Those skilled in the art will appreciate that the in situ pipeline coating system herein described and claimed can be employed using any suitable, commercially available two component coating composition. Such two-component coating compositions generally comprise a coating resin and a hardener, with or without various known ingredients or additives to facilitate the effective coating of a particular pipeline with a desired coating. Such coating compositions are commonly proportioned in a predetermined range of from about 1:1 to about 4:1 by volume resin/hardener, although particular coating compositions may have desirable proportions outside this range. A common proportion of coating resin to hardener is about 3/1 by volume resin/hardener. A variety of commercially available pipe coating compositions can be employed in the practice of the invention, such as Napko 7-0051 high performance in place pipeliner coatings designed for in-situ application by the use of pipeline pigs. Such coatings, marketed by Napko Pipe Coatings, comprise epoxy amine coatings having a mixing ratio of 3:1 by volume and 3–5 dry mils per coat. Epoxyamide coatings, such as Cook pipecoating 920-R-128, are also convenient for use in the practice of the invention. Chemically curing polyurethane coatings marketed by Madison Chemical Industries, Inc. are likewise suitable for use in the in situ coating of pipelines by the apparatus of the invention, as are numerous other two component coating compositions.

It will be understood that the double pig system used in the practice of the invention can comprise any suitable type of pigs capable of moving a body of coating composition through the pipeline to be coated, with the trailing pig causing the coating composition to be extruded into the internal surface of the pipeline. In conventional coating systems, disc or cup type pigs are commonly employed. As noted above, inflatable spheres can also be employed. Such spheres are commonly made of neoprene, polyurethane or like material, and have typically been employed in the art as so called running spheres capable of removing water from a line, separating fluids in a line, etc. and being of particular utility for such applications because of their facility in negotiating bends that may be present in the conduits being treated. For use in in-situ coating applications, such pigs are commonly inflated so as to be pressure fit into the pipeline to be coated and moved through the pipeline under the differential driving pressure imposed across the double pig system.

While the double pig system used in the practice of the invention may be inserted into the pipeline in any convenient manner in the field, it has been found particularly convenient to employ a particular injection head device to facilitate the movement of the pig system into the pipeline to be coated. The injection head device, it should be noted, is also suitable for use in the in situ cleaning of a pipeline prior to the in-situ coating thereof.

Those skilled in the art will appreciate that an important aspect of any coating or painting operation is the effectiveness of the cleaning of the surface to be coated before the application of the coating composition to the surface. While a pipeline desired to be recoated on the internal surfaces thereof after a period of use can, in some instances, be subdivided into separate segments that can be individually cleaned, by mechanical or other means, and then coated, such an operation will generally be prohibitively expensive and time-consuming, particularly with respect to very long pipelines. In many instances, such a laborious the cleaning and coating operation may be totally impractical, even apart from such time and expense considerations. For such reasons, the carrying out of the cleaning and the coating of pipelines by in-situ techniques is highly advantageous in the art. The invention as herein described and claimed represents a significant advance in the art of the in situ application of coatings to pipelines and conduits in an effective, efficient and environmentally desirable manner. By the use of the particular injection head device referred to above, the overall in-situ surface preparation, i.e., cleaning, and coating operation can be facilitated so as to further enhance the overall advantages of the in situ approach to surface preparation and coating.

It should be noted that, in most instances in which coatings are found to fail prematurely, such failure can commonly be traced to improper or insufficient surface preparation, whether by chemical or mechanical surface treatments known and available in the art. The in situ pipeline cleaning approach, however, has been found to be capable of consistently achieving an effective cleaning of the line and a highly desirable surface preparation for in-situ coating thereof. Thus, the in situ cleaning approach is able to achieve desirable surface anchor patterns, i.e., peak to valley, requirements necessary for satisfactory coating performance.

In the in-situ cleaning approach, a mobile, high capacity nitrogen pumping unit is typically employed to develop a high velocity nitrogen gas stream through the pipe to be cleaned. Cleaning particles, typically specially selected abrasive particles such as flint or grit, are injected into this propelling gas stream for passage through the pipe to be cleaned. Propelling gas velocities are employed such as to provide enough kinetic energy to enable the cleaning particles to make repeated contact with the internal wall of the pipe from the inlet end to the discharge end thereof. This repeated impact and abrasive action causes the contaminating material deposited on the internal wall of the pipe to be effectively removed. The effluent of nitrogen gas, cleaning particles and pipe contaminants pass through the pipeline and are collected at the discharge end in a standard covered dumpster type container. Dust can be suppressed by injecting a small amount of water into the effluent at the discharge end of the pipeline. In some instances, a vacuum truck is used for effluent collection purposes. Pressures in the pipeline typically range up to about 100 psig, and exit gas velocities may exceed 200 miles per hour. The length of the pipe that can be cleaned by such an in situ technique varies with the diameter of the pipe and other geometric considerations, such as bends in the line and the like. A typical line to be cleaned might be 8" in diameter and 14,000 feet in length.

The injection head particularly useful for the passage of nitrogen or other propellant gas to the pipeline for movement of the double pig system therethrough during in situ coating operations conveniently has a cleaning agent injection port for the injection of cleaning particles contained in a propelling gas stream through the injection head and into the pipeline for the in situ cleaning and surface preparation thereof prior to in situ coating. The injection head is attachable to the upstream inlet end of the pipeline to be coated. The gas propellant means for moving the double pig system through the pipeline comprises an inlet port on the injection head. An additional inlet port is conveniently provided on the injection head, said additional injection port being adapted to introduce additional propelling gas into the cleaning particle propelling gas stream for enhanced particle turbulence in the propelling gas stream and enhanced cleaning action by the cleaning particles, particularly at the inlet end of the pipeline to be cleaned in situ prior to the carrying out of the in-situ coating of the pipeline as disclosed and claimed herein.

Figure 3:
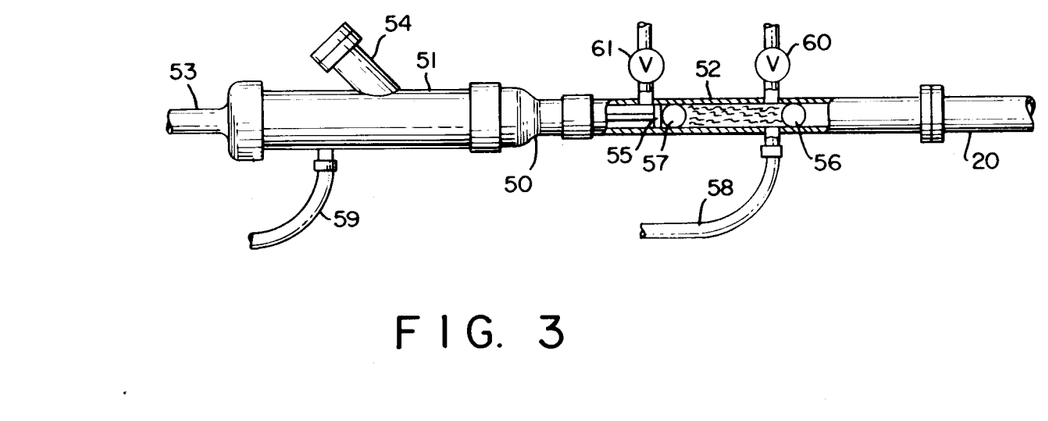
FIG. 3 represents a schematic view of an injection head device suitable for use in the in situ cleaning of a pipeline prior to the in situ coating thereof, said injection head also being suitable for facilitating the movement of the pig system into the pipeline.

In FIG. 3 of the drawings, the pipeline to be cleaned and coated is again represented by the numeral 20, and the preferred injection head device is represented generally by the numeral 50. The injection head comprises a cleaning particle/propelling gas injection section 51 and a coating composition injection section 52, with injection section 52 being attached to the inlet end of pipeline 20 and section 51 being upstream thereof. It will also be appreciated that, in some instances, the inlet end of pipeline 20 itself may serve as said coating composition injection section 52. For in situ cleaning and surface preparation purposes, it will be understood that the double pig system used for subsequent in-situ coating will not be positioned in section 52 of injection head 50.

The cleaning particles to be used for in situ cleaning of pipeline 20 are passed in an axial manner into gas injection section 51 through particle-entrained nitrogen propelling gas flow line 53 for passage therethrough and through section 52 into pipeline 20. Additional nitrogen propelling gas is injected into section 51 tangentially through nitrogen supply line 54, thereby enhancing the turbulence of the cleaning particles within injection head 50 and in the inlet portion of pipeline 20. Upon completion of the in situ cleaning operation, lines 53 and 54 can be disconnected, and injection head 50 can be prepared for the commencing of in situ coating operations.

Suitable pneumatic or mechanical means, such as pressurized nitrogen or hydraulic ram means, can be used to force fit a double pig system, illustrated as comprising leading pig 56 and trailing pig 57, into position in section 52 of injection head 50. The leading and trailing pigs of said double pig system used for coating will be separated by a predetermined distance such as to enable a desired quantity C of coating composition to be positioned therebetween for passage through pipeline 20 and extrusion onto the internal surface thereof. The coating composition is supplied by line 58, corresponding to line 18 in FIG. 1, from the self contained system described above for the advantageous proportioning, mixing and delivery of a two part coating composition to injection head 50 for passage through pipeline 20. It will be appreciated that leading pig 56 will be forced forward, i.e. in a downstream direction, under the hydraulic pressure of the injected coating material, thereby forming the double pig system with a desirable quantity of coating positioned between said leading and trailing pigs for passage through the pipeline to be coated. Plunger means 55 are conveniently positioned in section 51 and 52 of injection head 50 to prevent the movement of the trailing pig back into section 51 of injection head 50. Nitrogen supply line 59 is used to supply a propelling nitrogen gas stream to said section 51 to provide the driving force required, together with the back pressure imposed at the downstream end of pipeline 20, to propel leading pig 56 and trailing pig 57, and the coating composition positioned therebetween, through said pipeline 20. Vents 60 and 61 are affixed to section 52 immediately behind the desired positioning of leading pig 56 and trailing pig 57, respectively, to facilitate the positioning of said pigs in said section 52, vent 60 also serving to facilitate the introduction of coating composition into the space between leading pig 56 and trailing pig 57 by enabling gas to be vented from said space during the time in which coating composition is being passed into the injection head between said pigs.

Those skilled in the art will appreciate that the self contained system for the proportioning and mixing of a two component coating composition for injection into a pipeline to be coated, and the downstream discharge control system, enable an in situ coating operation to be effectively and efficiently carried out without exposure of operating personnel and the environment to the operating hazards encountered in conventional coating practices. As the risks to operating personnel and the environment of various industrial activities become increasingly within the consciousness of industry, governmental agencies and the public, the need for safer and more pollution free operations and systems becomes an ever more imperative requirement of industrial processing. The precluding of inadvertent and unplanned incidences leading to health, safety and environmental risks thus becomes a matter of higher priority than, for whatever reason, was the case even in the fairly recent past. The shut down of industrial operations and the imposing of applicable fines can be expected if even more restrictive safety or environmental protection laws are not faithfully observed. In the transport of gases and liguids in pipelines, such safety and environmental concerns and requirements suggest an increasing need for the prohibiting or inhibiting of corrosion, in order to prevent leakage as well as product contamination. Preventive maintenance programs are, as a result, more carefully developed, and more strictly followed, then heretofore may have been the case. The need to assure that pipelines are properly coated on the internal surfaces thereof to protect against corrosion, leakage and failure becomes, therefore, an ever more urgent task associated with industrial pipeline activities. The in situ coating of the internal surfaces of pipelines thus becomes an increasingly necessary and desirable factor in maintaining and enhancing the safety and environmental protection of industrial pipeline operations. The carrying out of such in situ coating operations themselves in a manner conducive to the health and safety of operating personnel, and to the protection of the environment, is an important aspect of pipeline maintenance operations. The size and complexity of the in situ coating operation contributes to the need for improved apparatus, systems and procedures for carrying out in situ coating operations in a safe and environmentally protective manner. Thus, the length of pipelines serviced by in situ coating and the amount of materials necessarily handled in the course of a typical in-situ coating operation, provide an indication of the magnitude of the problems that can arise in this regard if the indifference and negligence too often tolerated in the past were allowed to continue in the present climate of concern for health, safety and the environment. It will be appreciated that, in addition, each in situ pipeline coating operation typically involves several coating passes to assure proper coverage of the surface to be coated, freguently including the common use of primer or base, intermediate and top coats. The invention enables such in situ pipeline coating operations to be carried out in a manner serving to effectively overcome such health, safety and environmental concerns. Thus, the overall in situ coating operation can be carried out in the practice of the invention without solvent vapor exposure, liquid spills or drips, or exposure of operating personnel to pressurized gas, solvent vapors, liquid material splash or fire and explosive hazards, at both the upstream and the downstream end of the pipeline to be coated. In addition, the invention serves to enhance the effectiveness of the coating applied by precluding undesired air bubble formation in the coating composition. When employed in practical commercial pipeline maintenance operations, the in-situ coating apparatus of the invention will be seen, therefore, to provide a very significant advance in the field of pipeline coating. When combined with the desirable pipeline cleaning and surface preparation afforded by the in-situ pipeline cleaning approach referred to above, the in-situ coating invention herein disclosed and claimed accomplishes the highly desirable application of pipeline coatings in an advantageous manner, with enhanced adherence and durability in continued pipeline use, and with the problems of undesired exposure of operating personnel and the environment to pressurized gas, solvent vapors or liquid material splash being virtually eliminated by the self contained nature of the system as employed at both the inlet and the discharge ends of the pipeline.

I claim:

1. An apparatus for the proportioning and mixing of two part coating compositions for injection into a pipeline for the in situ coating of the internal surface thereof comprising:
    (a) a plural component proportioning device adapted to continuously receive separate amounts of each component of said two-component coating composition, and to discharge predetermined amounts of each component for mixing prior to injection into the pipeline to be coated, said device being self contained so as to preclude solvent vapor discharge and liquid component spills or drips therefrom;
    (b) separate storage means for each component of said two component coating composition;

(c) separate conduit means for passing each said component from the storage means to said plural component proportioning device;

(d) means for creating a positive pressure in each separate conduit means to facilitate the passing of each said component from its storage means to said plural component proportioning device;

(e) separate discharge conduit means for passing predetermined amounts of each said component from said plural component proportioning device;

(f) an in line mixer adapted for receiving and mixing the predetermined amounts of said components to form said two component coating composition without exposure to air; and (g) conduit means for passing the two component coating composition from the in-line mixer to the pipeline to be coated, whereby the separate components of the coating composition can be continuously proportioned, mixed and delivered to the pipeline to be coated in a self contained system without solvent vapor exposure, liquid spills, drips, or undesired air bubble formation in the coating composition.

2. The apparatus of claim 1 in which said two component coating composition comprises coating resin, and hardener, and said plural component proportioning device is adapted to discharge said resin and hardener in predetermined proportions in the range of from about 1:1 to about 4:1 by volume resin/hardener.

3. The apparatus of claim 2 in which said plural component proportioning device is adapted to discharge coating resin and hardener in the proportions of about 3/1 resin/hardener.

4. The apparatus of claim 1 in which said in line mixer comprises an inlet manifold and a motionless mixer.

5. The apparatus of claim 1 in which said motionless mixer includes baffle means therein to enhance the desired mixing of the components of the coating composition.

6. The apparatus of claim 1 and including a double pig system positioned in the pipeline to be coated, said conduit means for passing the two component coating composition to the pipeline being adapted to inject said coating composition into the pipeline at a position between the position of the two pigs prior to the commencement of passage of said pigs through the pipeline.

7. The apparatus of claim 6 and including gas propellant means for moving said double pig system, with a predetermined quantity of coating composition positioned between said pigs, through the pipeline to be coated.

8. The apparatus of claim 7 and including a throttle valve at the downstream end of the pipeline to be coated to control the back pressure in said pipeline and the pressure differential across said double pig system for controlled movement of said double pig system through said pipeline.

9. The apparatus of claim 8 and including excess coating composition collection means at the downstream end of the pipeline to be coated.

10. The apparatus of claim 1 in which said plural component proportioning device, in line mixer, storage means, pressure means and conduits are mounted on a trailer for ready movement to a pipeline jobsite, the trailer mounted, self-contained coating proportioning and mixing system facilitating the desirable in situ coating of pipelines.

11. An apparatus for maintaining a desired back pressure for the controlled movement of a double pig system, having a coating composition positioned between said pigs, through a pipeline to be coated, and for collecting excess coating material at the downstream end of the pipeline to be coated, comprising:

(a) a back pressure relief valve at the downstream end of the pipeline to be coated, said valve being adapted to maintain a desired back pressure at said downstream end of the pipeline as gas displaced by the movement of the pig system through the pipeline passes in the direction of said downstream end of the pipeline;

(b) bumper means positioned at the downstream end of the pipeline to stop the movement of the leading pig of said pig system at a predetermined location upstream of said pressure relief valve;

(c) conduit means for passing excess coating material discharged from the pipeline as the pressure between the leading and trailing pig increases upon the continued movement of the trailing pig in the direction of the leading pig, the movement of which is stopped by said bumper means; and (d) a collection vessel for said excess coating material discharged from the pipeline, said collection vessel having vent means for the removal of gases therefrom and liquid discharge means for the withdrawal of liquid coating material therefrom, whereby the passage of said double pig system through the pipeline to be coated can be conveniently controlled, and excess coating material can be conveniently discharged from the pipeline in a self-contained system without exposure of operating personnel to pressurized gas, solvent vapors or liquid coating material splash.

12. The apparatus of claim 11 and including a second pressure relief valve positioned upstream of said bumper means and of said leading pig upon the stopping of the movement thereof by said bumper means, said second pressure relief valve being adapted to discharge excess coating material from the pipeline at a predetermined pressure in excess of said desired back pressure.

13. The apparatus of claim 12 in which said pressure relief valves are valves preset at desired pressure levels, said second valve being preset at a higher pressure than that of said back pressure relief valve used to maintain back pressure at the downstream end of the pipeline.

14. The apparatus of claim 11 in which said back relief valve is a valve preset to maintain a desired back pressure at the downstream end of the pipeline.

15. An apparatus for the proportioning and mixing of two part coating compositions and the injection thereof into a pipeline for the in situ coating thereof in a controlled manner, with convenient collection of excess coating material at the downstream end of the pipeline, comprising:

(a) a plural- component proportioning device adapted to continuously receive separate amounts of said two-component coating composition, and to discharge predetermined amounts of each component for mixing prior to injection into the pipeline to be coated, said device being selfcontained so as to preclude solvent vapor discharge and liquid component spills or drips therefrom;

(b) separate storage means for each component of said two component coating composition;

(c) separate conduit means for passing each said component from the storage means therefor to said plural component proportioning device;

(d) means for creating a positive pressure in each separate conduit means to facilitate the passing of each said component from its storage means to said plural component proportioning device;

(e) separate discharge conduit means for passing predetermined amounts of each said component from said plural component proportioning device;

(f) an in line mixer adapted for receiving and mixing the predetermined amounts of said components to form said two-component coating composition without exposure to air;

(g) conduit means for passing said coating composition from the in line mixer to the pipeline to be coated at a coating injection point therein;

(h) a double pig system positioned initially so as to enable a predetermined amount of said coating composition to be positioned in the pipeline between the lead and trailing pigs of said pig system;

(i) gas propellant means for moving said double pig system, with said coating composition positioned between said pigs, through the pipeline to be coated;

(j) a back pressure relief valve at the downstream end of the pipeline to be coated, said valve being adapted to maintain a desired back pressure at said downstream end of the pipeline as gas displaced by the movement of the pig system through the pipeline passes in the direction of said downstream end of the pipeline;

(k) bumper means positioned at the downstream end of the pipeline to stop the movement of the lead pig of said pig system at a predetermined location upstream of said pressure relief valve;

(l) conduit means for passing excess coating material discharged from the pipeline as the pressure between the leading and trailing pig increases upon the continued movement of the trailing pig in the direction of the leading pig, the movement of which is stopped by said bumper means; and (m) a collection vessel for said excess coating material discharged from the pipeline, said collection vessel having vent means for the removal of gases therefrom and liquid discharge means for the withdrawal of liquid coating material therefrom, whereby the separate components of the coating composition can be continuously proportioned, mixed and delivered to the pipeline to be coated in a self contained system without solvent vapor exposure, liquid spills or drips, or undesired air bubble formation in the coating composition, the passage of the double pig system through the pipeline being conveniently controlled, and excess coating material can be conveniently discharged from the pipeline in a self contained system without exposure of operating personnel to pressurized gas, solvent vapors or liquid coating material splash.

16. The apparatus of claim 15 and including a second pressure relief valve positioned upstream of said bumper means and of said leading pig upon the stopping of the movement thereof by said bumper means, said second pressure relief valve being adapted to discharge excess coating material from the pipeline at a predetermined pressure in excess of said desired back pressure.

17. The apparatus of claim 16 in which said pressure relief valves are valves preset at desired pressure levels, said second valve being preset at a higher pressure than that of said back pressure relief valve used to maintain back pressure.

18. The apparatus of claim 15 in which said back pressure relief valve is a valve preset to maintain a desired back pressure at the downstream end of the pipeline.

19. The apparatus of claim 15 in which said coating composition comprises coating resin and hardener, and said plural component proportioning device is adapted to discharge said resin and hardener in predetermined proportions in the range of from about 1:1 to about 4:1 by volume resin/hardener.

20. The apparatus of claim 19 in which said plural component proportioning device is adapted to discharge coating resin and hardener in the proportions of about 3/1 resin/hardener.

21. The apparatus of claim 15 in which said in-line mixer comprises an inlet manifold and a motionless mixer.

22. The apparatus of claim 15 in which said plural component proportioning device, in-line mixing manifold, storage means and pressure means and conduits are mounted on a trailer for ready movement to a particular pipeline jobsite, the trailer mounted, self contained coating proportioning and mixing system facilitating the desirable in-situ coating of pipelines.

23. The apparatus of claim 15 and including an injection head for the passage of propellant gas to the pipeline for movement of the double pig system therethrough, said injection head having a cleaning agent injection port for the injection of cleaning particles contained in a propelling gas stream into the pipeline for the in situ cleaning of said pipeline prior to in situ coating, said injection head being attachable to the upstream inlet end of the pipeline to be coated, said gas propellant means for moving the double pig system through the pipeline comprising an inlet port on said injection head.

24. The apparatus of claim 23 and including an additional inlet port on said injection head and adapted to introduce propelling gas into said cleaning particle entrained propelling gas stream for enhanced particle turbulence therein and enhanced cleaning action by the cleaning particles at said inlet end of the pipeline to be cleaned in situ prior to in-situ coating.

* * * * *